UNITED STATES PATENT OFFICE.

FRANKLIN R. CARPENTER, OF DEADWOOD, SOUTH DAKOTA.

PROCESS OF TREATING ORES.

SPECIFICATION forming part of Letters Patent No. 499,318, dated June 13, 1893.

Application filed April 3, 1891. Serial No. 387,558. (No specimens.)

*To all whom it may concern:*

Be it known that I, FRANKLIN R. CARPENTER, a citizen of the United States, residing at Deadwood, in the county of Lawrence and State of South Dakota, have invented certain new and useful Improvements in Processes of Treating Ores; and I do hereby declare the following to be a full, clear, and exact description of the invention, such as will enable others skilled in the art to which it appertains to make and use the same.

My invention has for its object primarily the development of a special process of smelting involving the employment of a special form of slag and producing an iron matte carrying precious metals, and it will find its most advantageous application in the beneficiation of highly silicious ores of gold and silver in localities where the base metals commonly used in collecting and concentrating the precious metals in the ordinary smelting processes, are scarce and expensive.

The principles involved in my invention are capable of wider application, however, and I do not wish to be understood as limiting it to the special purpose and conditions above indicated.

While my invention can be applied with advantage to a wide variety of ores, I will take as a typical specimen, an ore containing eighty per cent. to eighty five per cent. of silica and five to ten per cent. of oxide of iron, carrying precious metals to the value of about fifteen to twenty dollars a ton. Where lead and copper are scarce, no single method of treating said ores, which will extract both silver and gold, is commercially practicable, and the application of separate processes, one to extract the gold and the other the silver, would also be too costly. If such an ore is smelted by ordinary processes, using either copper or lead to collect the precious metals, the losses of the base metals would be extremely high on account of the silicious nature of the ore and of the large amount of slag that would necessarily be produced. If, as is frequently the case, these ores are found in regions where lead and copper are scarce or even altogether wanting, it becomes practicably impossible to smelt them. To avoid these difficulties I employ an improved slag, a much smaller quantity of which is necessary to remove the silica and other impurities of the ore than is usually the case, and in the same smelting operation in which said slag is employed, I introduce or produce in the furnace a sulphide of iron free from lead and copper.

The main novelty in the composition of my improved slag is the introduction of a high percentage of magnesia as a constituent thereof.

In all writings on the subject of slags in precious metal smelting it is particularly dwelt upon that magnesia is a very undesirable base to have present, and it is insisted that it must be kept down to a low percentage. While this may be true in the type of slags generally adopted, that of a uni-silicate, I have found that by increasing the percentage of silica beyond the uni-silicate ratio approaching even the bisilicate ratio, I can at the same time increase the percentage of magnesia greatly, and I always prefer to have at least ten per cent. of that base in my slag. The magnesia may be supplied in any suitable form such as dolomite, magnesian limestone, or any other material containing magnesia, and I designate this addition as a magnesian flux. I prefer to have about twice as much lime as magnesia. The remaining bases are mainly iron with small amounts of other bases such as alumina, manganese, and alkalies. With high silica and so much lime and magnesia the oxide of iron must necessarily be low.

The introduction of magnesia, on account of its low specific gravity, has a highly beneficial effect upon the specific gravity of the slag, making it lower and thus giving the particles of matte a much better opportunity to separate out, thus increasing the amount of precious metals recovered. The high percentage of silica and the low percentage of oxide of iron also work in the same direction. In the practical application of this process many tons of slag have been made which do not show any gold or silver even when subjected to the most rigid assay. Practical work has demonstrated that this slag has a low heat of formation and a low melting point, and that when formed it is thin and liquid, so that the fuel consumption is unusually low when this improved slag is used.

In ordinary smelting it is necessary to keep the percentage of silica low, in order to prevent its solvent action on the base metal used to collect the precious metals, but in this case the silica has no solvent action on the compound used to collect the gold and silver and consequently the high percentage of silica is entirely allowable. The high percentage of silica in this slag decreases the amount of slag that is produced in melting a given amount of ore.

In ordinary smelting operations where the percentage of silica is kept down from twenty-eight to thirty-five per cent., an ore carrying from eighty to eighty-five per cent. of silica would produce from two and one-half to three tons of slag, but when fifty per cent. of silica is allowable, only from one and one-half to two tons of slag are produced for the same amount of ore; since the slag is essentially a waste product the economy of a smaller production is apparent. A smaller amount of slag always results in greater economy from the fact that slags retain mechanically, entangled, small portions of the valuable product of the smelting operation containing the precious metals. This causes a loss which will plainly be reduced as the amount of slag produced from a given amount of ore, is reduced. The practical advantages of this slag then, are, its low specific gravity which permits the complete separation of the matte containing the precious metals, its low melting point which gives a low fuel consumption by its use, the small amount of slag produced from a ton of ore on account of its high percentage of silica, and the absence of any solvent action on the compound used to collect the precious metals.

Going on to the second part of my invention, namely, the use of a sulphide of iron free from copper or lead, I am aware that mattes containing sulphide of iron have been frequently used to collect the precious metals, but heretofore these mattes have always contained either lead or copper or both, and all writers upon the subject maintain that the presence of one of these metals is absolutely necessary to secure a high concentration and successful working. I have discovered, however, that these metals are in no wise necessary, and that an ore can be treated just as successfully without either as with. Moreover the presence of copper in such a matte is a decided disadvantage on account of the difficulties connected with the separation of the gold and silver from the copper in the subsequent operations. In other words, with the choice of two sulphides of iron to use in collecting the precious metals, one containing a small amount of copper, and the other none, the second one would yield a more economical result.

In some cases the sulphur necessary to form the matte may be present in the ore to be treated, but in almost all cases sulphur must be added. The most convenient form in which to add it is the mineral pyrite or bi-sulphide of iron, on account of the abundance in which this mineral occurs. Other native sulphides of iron may be used, however, and under favorable conditions artificial sulphide, or even sulphur, can be used. It will scarcely ever happen that there is not sufficient iron present in the ore, but when it does, the deficiency can be easily supplied. The amount of sulphide of iron necessary to collect the precious metals will vary according to the richness of the ore and the percentage of silica in it. The richer the ore and the more silica present the more matte will be required. In the typical ore before mentioned containing from fifteen to twenty dollars' worth of precious metals per ton, and from eighty to eighty-five per cent. of silica, I have found one ton of matte to be sufficient to collect the precious metals from twenty to thirty tons of ore.

In carrying out my invention upon the typical ore mentioned, which is free from pyrite, I first calculate the amount of sulphide of iron required to form about one ton of matte from twenty-five tons of ore, and then add a suitable amount of pyrite free from copper. After subtracting the amount of iron that must be furnished by the ore to form the matte, I then calculate the amount of lime and magnesia required to form a slag of the following general composition: silica, forty-three to fifty per cent.; magnesia, ten to twelve per cent.; lime, twenty to twenty-five per cent.; oxide of iron, six to twenty per cent. These bases are added to the charge as required, preferably in the form of dolomite and magnesian lime stone. These materials are then charged, together with fuel, into a suitable furnace which is preferably a modification of the German Spurofen. In this furnace a portion of the excess of sulphur in the pyrite may be consumed in forming the sulphides of the precious metals, and the remainder unites with some of the iron obtained from the ore or from other constituents of the charge, forming the normal sulphide FeS. As the charge gathers up and dissolves the precious metals, probably as sulphides, the slag forming constituents of the charge fuse together at the same time and form the slag. After the charge is liquefied the matte readily separates from the slag by its greater specific gravity. This separation may take place in the fusion furnace, but it is preferable to allow the molten mattes to flow out of this furnace, as formed, and to allow the separation to take place in a separate chamber.

The precious metals may be separated from the matte by several different processes, but I prefer to use the one described in my application, Serial No. 379,293, before mentioned. This process consists in adding lead to the molten sulphide, which latter may or may not have been concentrated by an intermediate treatment. This lead will alloy with the precious metals and remove them from the matte. It is in this treatment with lead that the advantages of a matte free from copper, become most apparent. If copper is present it is impossible to separate all the precious metals by lead, even with repeated treatments, while in the absence of copper the separation is perfect.

Having therefore described my invention, what I claim as new, and desire to protect by Letters Patent, is—

1. The improved method of fluxing silicious ores of gold and silver which consists of the following steps; first, mixing with the ores a sufficient quantity of flux containing magnesia to form a slag which shall have the percentages of its main constituents within the following approximate limits — silica, forty-three to fifty per cent., magnesia ten to twelve per cent., lime twenty to twenty-five per cent., other bases, six to twenty per cent.; second, applying heat to the mixture, substantially in the manner described.

2. The process of treating silicious ores of gold and silver which consists of the following steps; first, mixing with the ores a sufficient quantity of flux containing magnesia to form a slag which shall have the percentages of its main constituents within the following approximate limits — silica forty-three to fifty per cent., magnesia ten to twelve per cent., lime twenty to twenty-five per cent., other bases, six to twenty per cent.; second, adding a proper quantity of sulphide of iron matte forming materials free from copper and from lead; third, applying heat, whereby a slag is formed of the above composition having a low specific gravity, and there is separated from the slag by gravity a sulphide of iron matte free from copper and from lead, which matte takes up the precious metals, all substantially as described.

3. The process of treating silicious ores of gold and silver which consists of the following steps; first, mixing with the ores a sufficient quantity of flux containing magnesia to form a slag which shall have the percentages of its main constituents within the following approximate limits—silica, forty-three to fifty per cent., magnesia ten to twelve per cent., lime, twenty to twenty-five per cent.; other bases, six to twenty per cent.; second, adding a proper quantity of sulphide of iron matte forming materials free from copper and from lead; third, applying heat, whereby a slag is formed of the above composition having a low specific gravity, and there is separated from the slag by gravity a sulphide of iron matte free from copper and from lead, which matte takes up the precious metals; fourth, adding lead to the molten sulphide, all substantially as described.

In testimony whereof I affix my signature in presence of two witnesses.

FRANKLIN R. CARPENTER.

Witnesses:
FRANK MCLAUGHLIN,
EDWIN VAN CISE.